United States Patent [19]

Huber

[11] Patent Number: 5,161,660
[45] Date of Patent: Nov. 10, 1992

[54] CLUTCH PLATE WITH PLURAL DAMPERS

[75] Inventor: Lothar Huber, Bühl/Altschweier, Fed. Rep. of Germany

[73] Assignee: Luk Lamellen und Kupplungsbau GmbH, Bühl, Fed. Rep. of Germany

[21] Appl. No.: 782,507

[22] Filed: Oct. 25, 1991

[30] Foreign Application Priority Data

Nov. 15, 1990 [DE] Fed. Rep. of Germany ....... 4036368

[51] Int. Cl.⁵ .................................................. F16D 3/14
[52] U.S. Cl. ................................ 192/106.2; 192/70.17
[58] Field of Search ................ 192/70.17, 106.1, 106.2

[56] References Cited

U.S. PATENT DOCUMENTS

| | | | |
|---|---|---|---|
| 4,533,338 | 8/1985 | Hamada | 192/106.2 X |
| 4,564,097 | 1/1986 | Kabayama | 192/106.2 X |
| 4,573,945 | 3/1986 | Kajitani et al. | 192/106.2 X |
| 4,690,660 | 9/1987 | Hashimoto | 192/106.2 X |
| 4,924,728 | 5/1990 | Mori | 192/106.2 X |
| 4,944,499 | 7/1990 | Tojima | 192/106.2 X |
| 4,993,530 | 2/1991 | Maki | 192/106.2 |
| 5,004,088 | 4/1991 | Bolton | 192/106.2 |
| 5,009,301 | 4/1991 | Spitler | 192/106.2 |
| 5,025,904 | 6/1991 | Graton et al. | 192/106.2 |
| 5,038,906 | 8/1991 | Minbu | 192/106.2 |

FOREIGN PATENT DOCUMENTS

| | | |
|---|---|---|
| 1675143 | 12/1970 | Fed. Rep. of Germany . |
| 1750841 | 7/1972 | Fed. Rep. of Germany . |
| 3149656 | 7/1990 | Fed. Rep. of Germany . |

*Primary Examiner*—Leslie A. Braun
*Assistant Examiner*—Nicholas Whitelaw
*Attorney, Agent, or Firm*—Peter K. Kontler

[57] ABSTRACT

A clutch plate wherein the input member carries friction linings and the output member includes a flange which is connected to a hub by a first damper. A second or main damper has a set of weaker and a set of stronger coil springs which are received in windows of the carrier and flange. The carrier is provided with projections which are receivable in circumferentially extending recesses of the flange to limit the extent of movability of the carrier and flange relative to each other from a neutral position to either of two end positions which can be reached by turning the carrier and the flange in opposite directions or by turning the carrier or the flange relative to the flange or carrier in a clockwise or counterclockwise direction. The recesses are provided in weakened sections of the flange between neighboring windows for stronger and weaker springs. In order to avoid excessive stressing of such sections in the two end positions of the flange and carrier relative to each other, one group of projections engages abutments in the respective recesses in the first end positions and another group of projections engages different abutments in the respective recesses in the second end positions of the flange and carrier. In addition, a weakened section which is engaged by a projection and by a stressed relatively weak spring is not engaged by a stressed stronger spring, and a weakened section which is engaged by a stressed stronger spring is not engaged by a projection and/or by a stressed relatively weak spring.

12 Claims, 3 Drawing Sheets

CLUTCH PLATE WITH PLURAL DAMPERS

BACKGROUND OF THE INVENTION

The invention relates to clutch plates or clutch discs in general, and more particularly to improvements in clutch plates or clutch discs (hereinafter called clutch plates) with several sets of energy storing elements installed between an input member and an output member. Such clutch plates can be used with advantage in friction clutches for motor vehicles, in hydrokinetic torque converters and in many other types of torque transmitting apparatus.

German Auslegeschrift No. 1 750 of Adachi (published Jul. 6, 1972) and German patent application No. 1 675 143 of Poteschil (published Dec. 3, 1990) disclose clutch plates of the type wherein two sets of energy storing elements in the form of coil springs are installed in the windows of a rotary input member (such input member can include a substantially disc-shaped carrier of friction linings) and a rotary output member (such output member can include a flange) and are designed to store energy when at least one of the input and output members leaves a neutral position and is rotated to assume one of two end positions relative to the other of these members. The aforementioned German publications further disclose projections which are provided on one of the input and output members and engage abutments on the other of the input and output members in each of the two end positions of at least one of the two members relative to the other member. The flange-like output member is rigid with the hub of the clutch plate, and the input member is assembled of two parts, namely the aforementioned carrier of friction linings and a disc which is spaced apart from and is rigidly connected to the carrier. The flange is located between the disc and the carrier and is provided with windows for the energy storing elements; such energy storing elements further extend into windows which are provided therefor in the carrier and in the disc. The projections are constituted by rivets or bolts which connect the disc to the carrier and are received, with limited freedom of movement in the circumferential direction of the input and output members, in recesses which are provided in the flange.

It is further known to install the carrier of friction linings between two discs which are rigidly connected to each other, either by bolts or rivets or by lugs which are integral parts of one of the discs and extend axially of the clutch plate into recesses of the other disc. The carrier has slots for the lugs of the one disc; the surfaces bounding the slots of the carrier act as abutments to determine the extent of angular movability of the carrier relative to the discs and vice versa.

German patent application No. 31 49 656 of Beccaris (published Jul. 15, 1992) discloses a clutch plate wherein a disc-shaped carrier of friction linings is connected with a second disc by a set of distancing elements in the form of rivets or bolts. The distancing elements extend through slots which are provided in the flange radially inwardly of energy storing elements in the form of coil springs which are received in windows of the carrier, disc and flange. The flange is rotatable relative to the hub of the clutch plate against the opposition of a relatively weak additional or auxiliary damper.

A drawback of presently known clutch plates, including the aforediscussed clutch plates, is that all of the projections (be they in the form of bolts, rivets or lugs) are supposed to simultaneously engage the associated abutments in each of the two end positions of the input and output members relative to each other. In other words, all of the projections are to participate in stoppage of the input and output members in each of the two end positions. This creates problems because the input and output members as well as the projections and the abutments for the projections are not, and cannot always be, made and machined or finished with a degree of precision which is required to ensure that each of a number of projections will invariably engage an adjacent abutment when the input and output members assume their first and/or second end positions, i.e., exactly upon completion of maximum angular movement of one of the input and output members relative to the other member in a clockwise or in a counterclockwise direction. Consequently, and as a rule, only one projection or a small number of projections will actually bear against the adjacent abutment or abutments in either of the two end positions of the input and output members relative to each other. This, in turn, enhances the likelihood of breakage of and/or excessive wear upon certain relatively weak sections or portions of that member which is provided with the recesses (e.g., in the form of slots or cutouts) for the projections of the other member. Furthermore, lack of a high degree of accuracy in the configuration and/or mounting or positioning of the projections and/or of the abutments for such projections can result in radial stressing of the input and output members, i.e., one or more projections are likely to move the member which is provided with the recesses away from a position of exact concentricity with the other member. This, too, can entail extensive wear upon and can reduce the useful life of a clutch plate.

Additional problems are likely to arise when the energy storing elements of a damper in a clutch plate include relatively weak and relatively strong energy storing elements. Thus, if a relatively weak portion of the input member and/or of the output member is simultaneously acted upon by a strong spring, by a weak spring and by a projection, such weak portion is likely to break after a relatively short period of use of the clutch plate.

OBJECTS OF THE INVENTION

An object of the invention is to provide a clutch plate which is constructed and assembled in such a way that the useful life of its input and/or output member is longer than that of input and output members in heretofore known clutch plates.

Another object of the invention is to provide a clutch plate wherein the weakened parts of the input member and/or of the output member are shielded from excessive stresses during each stage of angular movement of the input and output members relative to each other.

A further object of the invention is to provide the clutch plate with novel and improved means for limiting the extent of movability of the input and output members relative to each other.

An additional object of the invention is to provide a simple and inexpensive clutch plate and to provide such clutch plate with a novel and improved output member.

A further object of the invention is to provide a novel and improved method of limiting the magnitude of stresses upon relatively weak sections or portions of the input and/or output member, particularly in each of the two end positions of such members relative to one another.

Another object of the invention is to provide a novel and improved method of distributing the projections and the abutments for such projections in a clutch plate wherein the energy storing elements of at least one damper are assembled into sets of stronger and weaker energy storing elements.

A further object of the invention is to provide a friction clutch or a torque converter which embodies a clutch plate of the above outlined character.

An additional object of the invention is to provide a clutch plate wherein stronger and weaker springs are prevented from simultaneously bearing upon relatively weak portions of the input and/or output member.

Another object of the invention is to provide a clutch plate which embodies the aforediscussed features and can be installed in existing friction clutches, torque converters and/or other apparatus as a superior, particularly longer lasting, substitute for heretofore known clutch plates.

SUMMARY OF THE INVENTION

The invention is embodied in a clutch plate, particularly for use in friction clutches for motor vehicles. The improved clutch plate comprises an input member having first windows, an output member having second windows, and at least two sets of energy storing elements each of which is received in a first window as well as in a second window. The input and output members are rotatable relative to each other from a neutral or starting position to first and second end positions in clockwise and counterclockwise directions, respectively, with attendant stressing of the energy storing elements. One of the input and output members has projections, and the other of these members has recesses and abutments for the projections in the recesses. The other member includes sections or portions which are disposed between the respective windows and are provided with the aforementioned abutments. Each section further comprises a pair of stops in the windows of the other member. The arrangement is such that the energy storing elements of one of the sets store first amounts of energy and the elements of another of the sets store smaller second amounts of energy in the end positions of the input and output members. The sections of the other member include first sections which are acted upon by projections and by elements of the other set and second sections which are acted upon by elements of the one set in one of the two end positions; the second sections are acted upon by projections and by elements of the other set and the first sections are acted upon by elements of the one set in the other of the two end positions.

At least one of the input and output members can include at least one disc.

The recesses can be provided in the sections of the other member.

The projections can include rivets, and the recesses can be provided in the peripheral surface of the other member.

The elements of the one set preferably alternate with the elements of the other set in the circumferential direction of the input and output members, and each section is preferably disposed between a window for an element of the one set and a window for an element of the other set. One stop of the pair of stops in each window of the other member for an element of the one set is or can be disengaged from the respective element (of the one set) in one of the two end positions of the two members, and the other stop of the pair of stops in each window of the other member for an element of the one set is or can be disengaged from the respective element (of the one set) in the other end positions of the two members. Each abutment is adjacent a different stop, and the projections preferably engage those abutments which are adjacent the disengaged stops for the elements of the one set in each of the two end positions of the input and output members.

Each element of the one set of elements can comprise a plurality of springs, the windows for the elements of the one set can be disposed substantially diametrically opposite each other, and the windows for the elements of the other set can also be disposed substantially diametrically opposite each other. Those windows of the other member which receive portions of the elements of the one set are or can be larger than the windows which are provided in the other member to receive portions of the elements of the other set.

In accordance with a presently preferred embodiment, each set of energy storing elements comprises two elements, and the elements of the one set alternate with the elements of the other set in the circumferential direction of the input and output members. Each element can comprise one or more coil springs.

The recesses are preferably provided in the output member, and the input member can comprise two spaced-apart discs. The projections can include distancing elements (e.g., in the form of rivets) which are disposed between and connect the discs of the input member to each other.

The novel features which are considered as characteristic of the invention are set forth in particular in the appended claims. The improved clutch plate itself, however, both as to its construction and the mode of assembling the same, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
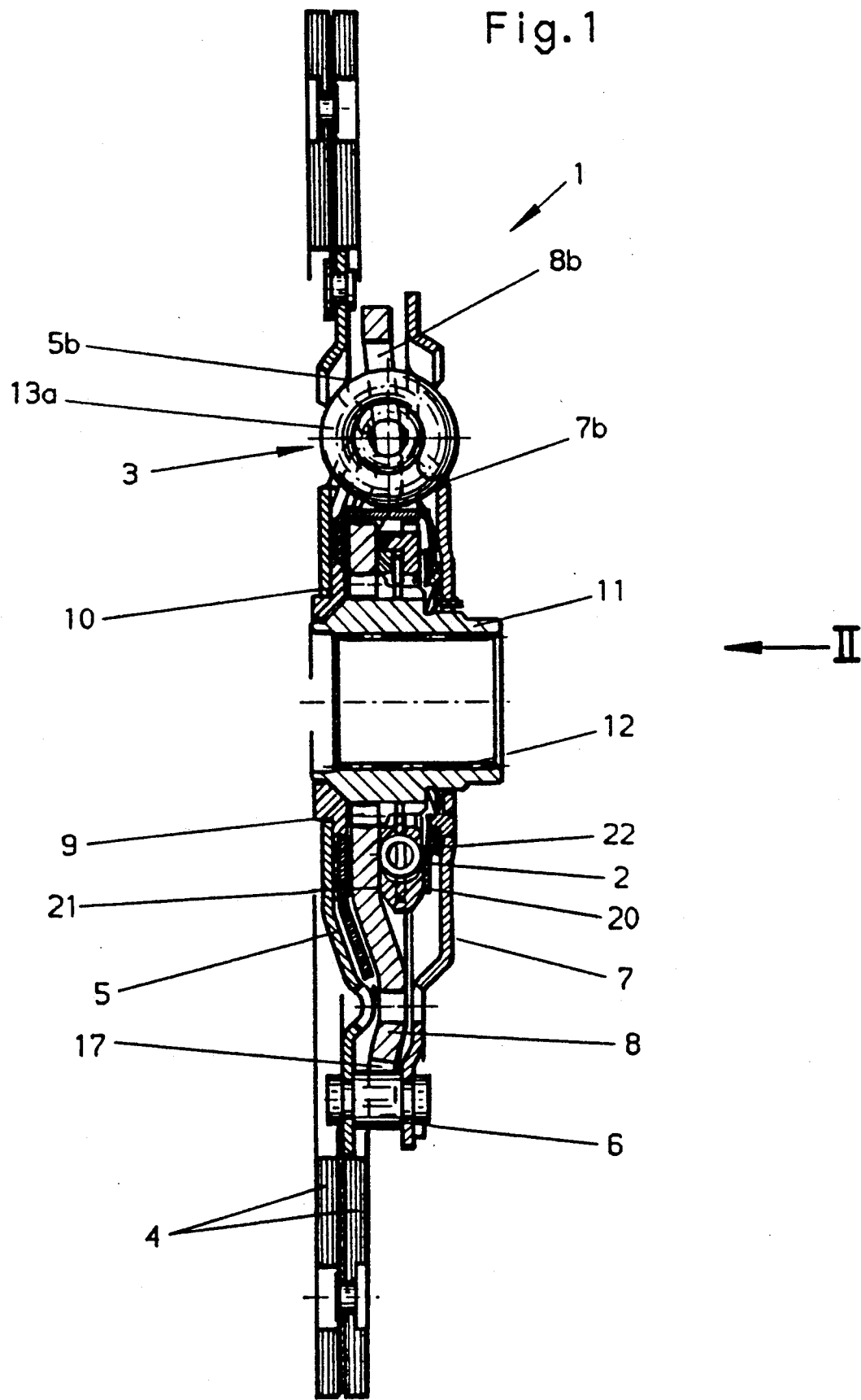
FIG. 1 is an axial sectional view of a clutch plate which embodies one form of the invention.
Figure 2:
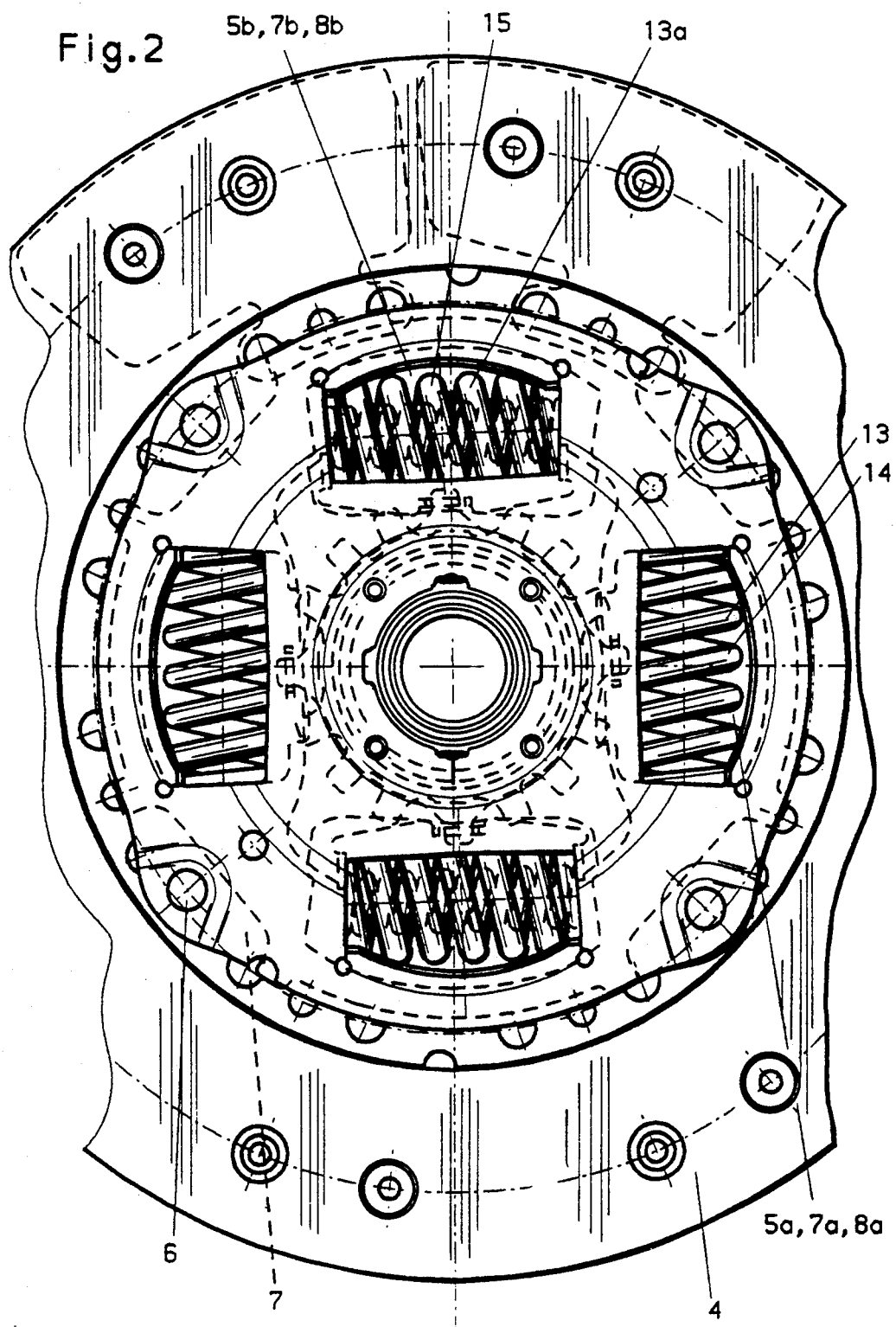
FIG. 2 is a fragmentary elevational view as seen in the direction of arrow II in FIG. 1.
Figure 3:
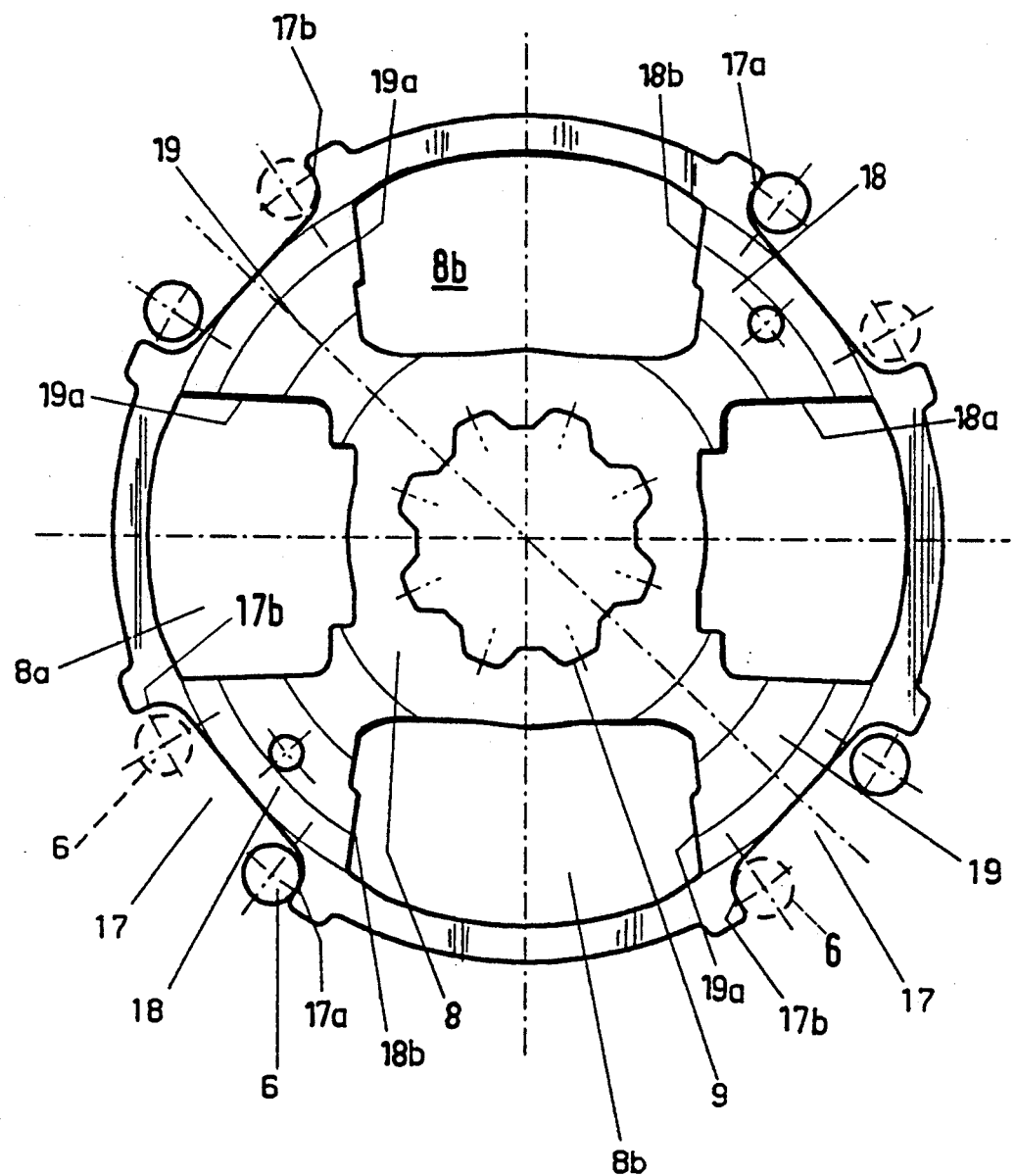
FIG. 3 is an elevational view of the output member, each projection of the input member being shown in two different positions while extending into the corresponding recess of the output member.

The clutch plate 1 which is shown in FIGS. 1 and 2 comprises a first damper 2 and a second or main damper 3. The input member of the clutch plate 1 constitutes the input member of the main damper 3 and includes a disc-shaped carrier 5 of friction linings 4 and a second disc 7 spaced apart from and rigidly connected to the carrier 5 by projections in the form of distancing elements or rivets 6. FIGS. 2 and 3 show that the input member including the carrier 5 and the disc 7 comprises a total of four circumferentially spaced apart equidistant or nearly equidistant projections 6.

The output member of the clutch plate 1 includes a disc-shaped flange 8 which is the output member of the main damper 3 and has an annulus of internal teeth 9 mating, with a certain amount of circumferential play, with the external teeth 10 of a hub 11 which constitutes another part of the output member of the clutch plate 1. The hub 11 has axially parallel internal splines 12 so that it can be slipped onto the externally splined input shaft of a variable-speed transmission (not shown) serving to receive torque from an internal combustion engine (not shown) by way of a friction clutch which includes the clutch plate 1. The circumferential play between the internal teeth 9 of the flange 8 and the external teeth 10 of the hub 11 determines the range of operation of the first damper 2.

The main damper 3 further comprises two sets 13, 13a of energy storing elements in the form of coil springs acting in the circumferential direction of the input member 5, 7 and output member 8, 11. The set 13 includes discrete coil springs 14, and the set 13a includes pairs of coil springs 15 including a larger-diameter outer coil spring and a smaller-diameter inner coil spring which is confined in the outer coil spring. The springs 14 are disposed diametrically opposite each other, the same as the springs 15. Each spring 14 is received in the windows 5a, 7a, 8a of the carrier 5, disc 7 and flange 8, respectively, and each spring 15 is received in the windows 5b, 7b, 8b of the carrier 5, disc 7 and flange 8, respectively. FIG. 3 shows that the windows 8a of the flange 8 are smaller than the windows 8b, namely they are shorter in the circumferential direction of the flange 8.

The length of each window 5a matches the length of the registering windows 7a and 8a, and the springs 14 of the set 13 are received in their respective windows 5a, 7a, 8a practically without any play. The springs 14 can be installed in stressed or unstressed condition. The length of the windows 5b matches the length of the registering windows 7b but is less than that of the corresponding windows 8b. The springs 15 of the set 13a can be installed in their respective windows 5b, 7b with or without initial stressing. When the input member (including the carrier 5 and disc 7) and output member (including the flange 8 and hole 11) of the clutch plate 1 are permitted to assume their starting or neutral positions, the end convolutions of the springs 15 are spaced apart from at least one of the two stops 18b, 19a in the respective windows 8b. It is preferred to select the starting or neutral position of the output member including the flange 8 in such a way that the end convolutions of each of the two pairs of springs 15 are spaced apart (i.e., disengaged) from each of the respective stops 18b, 19a. The clearance between a pair of springs 15 and one of the stops 18b, 19a can be greater than the distance between such pair of springs and the other stop when the flange 8 is maintained in the starting position. The arrangement may be such that the angular displacement of the input and output members of the clutch plate relative to each other in the direction of traction (when the engine drives the input shaft of the transmission through the engaged friction clutch) before the flange 8 begins to engage the springs 15 must be greater than the angular displacement in the other direction (when the vehicle is coasting).

The springs 14 are designed in such a way that their force (i.e., the amount of stored energy) in the one or the other end position of the input member relative to the output member of the clutch plate 1 or vice versa is less than the amount of energy which is then stored by the pairs of springs 15. The amount of energy which is stored by the springs 14 in either of the two end positions (when the input and output members can no longer turn relative to each other) can be considerably less than the amount of energy which is then stored by a pair of springs 15. The extent of angular movability of the input and output members of the clutch plate 1 relative to each other is determined by the projections 6 which extends into recesses 17 provided in the peripheral surface of the flange 8. Two of the four projections 6 engage the adjacent abutments 17a in the respective recesses 17 in one end position of the input and output members (i.e., of the carrier 5 and disc 7 on the one hand and the flange 8 and hub 11 on the other hand) relative to each other, and the other two projections 6 engage the abutments 17b in the respective recesses 17 in the other end positions of the input and output members.

FIG. 3 shows that the flange 8 includes four substantially triangular sections 18 and 19. The sections 18 alternate with the sections 19 in the circumferential direction of the flange 8, and each of these sections is disposed between a window 8a for a spring 14 and a window 8b for a pair of springs 15. The recesses 17 are provided in the radially outermost portions of the sections 18 and 19, i.e., the abutments 17a, 17b in each recess 17 are defined by the respective section 18 or 19, and each of these sections further includes two stops 18a, 18b or 19a, 19b one in each of the two neighboring windows 8a, 8b.

The width of the sections 18, 19 decreases radially inwardly due to the shape of the windows 8a and 8b, i.e., each of these sections is relatively sturdy at the respective recess 17 but is much weaker in the region adjacent the internal teeth 9 of the flange 8. Pronounced weakening of the radially inner parts of the sections 18 and 19 is attributable primarily to the fact that the length of the windows 8b for the pairs of springs 15 exceeds the length of the windows 8a (as seen in the circumferential direction of the flange 8). As mentioned above, the windows 8b are larger than the windows 8a because they are designed in such a way that the stops 18b, 19a therein are disengaged from the adjacent end convolutions of the respective pairs of springs 15 in the neutral positions of the input and output members of the clutch plate 1. This ensures that the characteristic curve of the main damper 3 is a stepped curve, i.e., angular movements of the input and output members from their neutral positions are opposed first by the relatively weak springs 14 and thereafter by the springs 14 jointly with the pairs of springs 15. In other words, the springs 14 begin to store energy (or to store additional energy) as soon as the input and/or the output member leaves its neutral position; on the other hand, the two members must complete a certain angular movement relative to each other (in a clockwise direction or in a counter-clockwise direction) before the pairs of springs 15 begin to store energy or before these pairs of springs begin to store additional energy (depending upon whether or not the pairs of springs 15 are installed in stressed condition).

In order to avoid undue stressing of the sections 18 and 19 between the windows 8a and 8b of the flange 8, the positions of the projections 6 and the dimensions of the recesses 17 are selected in such a way that the flange 8 is acted upon only by two of the four projections 6 in one of the two end positions of the input and output members relative to each other, and that the flange 8 is acted upon only by the other two projections 6 when the input and output members assume the other end positions. FIG. 3 shows that two of the four projections 6 engage the adjacent abutments 17a because the flange 8 is shown in one of its two end positions. When the flange 8 is caused to assume the other end position (or when the input member is turned to the other end position), the other two projections 6 engage the adjacent abutments 17b in the respective recesses 17 (the other end positions of the projections 6 are indicated in FIG. 3 by broken lines). The just discussed feature ensures that only two of the four sections 18, 19 are being acted upon by projections 6 in each of the two end positions of the flange 8 and/or carrier 5. In addition, the projections 6 engage only the abutments (17a or 17b) adjacent the stops 18b or 19a which, at that time, are not acted upon by the stronger springs 15. Thus, the projection 6 at the seven o'clock position in FIG. 3 engages the adjacent abutment 17a in the corresponding recess 17 while the spring 15 (not shown in FIG. 3) in the lower window 8b of FIG. 3 is disengaged from the stop 18b of the respective section 18. The same applies for the projection 6 which engages the other section 18, i.e., the stop 18b of such section 18 is then disengaged from the springs 15 in the upper window 8b of FIG. 3.

If the flange 8 or the carrier 5 with its projections 6 is then moved to the other end position, the projection 6 at the seven o'clock position is slightly spaced apart from the abutment 17b in the respective recess 17 and the stop 18b in the lower window 8b is engaged by the fully stressed springs 15 in such window. At the same time, the right-hand stop 19a in the lower window 8b of FIG. 3 is disengaged from the respective springs 15 but the adjacent abutment 17b in the recess 17 at the 4½ o'clock position is engaged by the respective projection 6.

The same applies for the abutments 17a, 17b and stops 18b or 19a of all other sections of the flange 8, i.e., each section is engaged by a projection 6 when it is not engaged by a pair of springs 15 and, when a section is engaged by a projection 6 and by a stressed weaker spring 14, it is disengaged from the respective stronger springs 15. This ensures that the sections 18, 19 of the flange 8 are not unduly stressed in either end position of the flange 8 and/or carrier 5. In other words, a section 18 or 19 cannot be simultaneously acted upon by a fully stressed spring 14 as well as by a fully stressed spring 15; a section 18 or 19 is acted upon by a stressed weaker spring 14 and by a projection 6 in one of the two end positions of the input and output members relative to each other, and by a pair of stressed stronger springs 15 (but not by a spring 14 and/or by a projection 6) in the other end positions of the input and output members relative to each other.

As already mentioned above, FIG. 3 shows by solid lines those positions of the projections 6 which the projections assume in one of the two end positions of the input and output members relative to each other, e.g., when the clutch plate 1 transmits torque from the output element (e.g., a crankshaft) of the engine to the input shaft of the transmission. The projections 6 assume the broken-line positions of FIG. 3 in the other end positions of the input and output members relative to each other, e.g., when the engine is coasting, i.e., when the friction clutch including the clutch plate 1 is called upon to transmit torque from the input shaft of the transmission to the output element of the engine. Two of the four projections 6 are idle in one of the two end positions, and the other two projections 6 are idle in the other end positions of the input and output members relative to each other.

The energy storing elements of the main damper 3 can be assembled into three or more groups or sets. The operation is then analogous to the operation of the illustrated clutch plate 1, i.e., it is merely necessary to ensure that none of the sections forming part of the flange 8 will be simultaneously acted upon by a projection 6, by a relatively weak spring and by one or more much stronger springs in either of the two end positions of the input and output members. Inversely, when a section is acted upon by at least one highly stressed strong spring, it is not acted upon simultaneously by a weaker spring as well as by one of the projections 6. This invariably ensures that the useful life of the (input or output) member which includes the sections and the recesses 17 for the projections 6 is longer than in heretofore known clutch plates.

The stronger springs 15 need not be fully disengaged from those sections 18 or 19 which are engaged by projections 6, i.e., the stronger springs 15 can react against the stops 18b or 19a of the sections 18 or 19 as long as they do not subject the sections to a maximum force while the sections are simultaneously acted upon by the projections 6 and by the fully stressed weaker springs 14. Absence of simultaneous stressing of a section 18 or 19 by a fully compressed spring 14 as well as by a pair of fully compressed springs 15 is particularly important when the maximum bias of a pair of fully stressed springs 15 appreciably exceeds the maximum bias of a fully compressed spring 14.

The first damper 2 is located axially between the flange 8 and the carrier 5. The input member 20 of the damper 2 is rigid with the flange 8 and can be made of a suitable plastic material. The output member 21 of the damper 2 is non-rotatably connected with the hub 11. Relatively weak energy storing elements 22 in the form of circumferentially acting coil springs are installed in windows which are provided therefor in the input and output members 20, 21 of the damper 2.

The improved clutch plate is susceptible of numerous additional modifications without departing from the spirit of the invention. For example, the clutch plate can be put to use in hydrokinetic torque converters or in dampers of the type having an input member which is rigidly connected with a rotary output element (such as the crankshaft of an engine) and an output member which is rigidly connected with a rotary input element (such as the input shaft of a transmission).

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A clutch plate comprising an input member having first windows; an output member having second windows; and at least two sets of energy storing elements each received in a first window and in a second window, said members being rotatable relative to each other from a neutral position to first and second end positions in clockwise and counterclockwise directions, respectively, with attendant stressing of said elements, one of said members having projections and the other of said members having recesses and abutments in said recesses for said projections, said other member including sections disposed between the respective windows and provided with said abutments, each of said sections further having a pair of stops in the windows of said other member, the elements of one of said sets storing first amounts of energy and the elements of another of said sets storing smaller second amounts of energy in the end positions of said members, said sections including first sections which are acted upon by said projections and by the elements of said other set and second sections which are acted upon by the elements of said one set in one of said end positions, said second sections being acted upon by said projections and by the elements of said other set and said first sections being acted upon by the elements of said one set in the other of said end positions.

2. The clutch plate of claim 1, wherein at least one of said members includes at least one disc.

3. The clutch plate of claim 1, wherein said recesses are provided in said sections.

4. The clutch plate of claim 1, wherein said projections include rivets, said other member having a peripheral surface and said recesses being provided in said peripheral surface.

5. The clutch plate of claim 1, wherein the elements of said one set alternate with the elements of said other set in the circumferential direction of said members, each of said sections being disposed between a window for an element of said one set and a window for an element of said other set.

6. The clutch plate of claim 5, wherein one stop of the pair of stops in each window of said other member for an element of said one set is disengaged from the respective element in one end position and the other stop of the pair of stops in each window of said other member for an element of said one set is disengaged from the respective element in the other of said end positions, each of said abutments being adjacent a different stop and said projections engaging those abutments which are adjacent the disengaged stops for the elements of said one set in each of said end positions.

7. The clutch plate of claim 1, wherein each element of said one set comprises a plurality of springs.

8. The clutch plate of claim 1, wherein the windows for the elements of said one set are disposed substantially diametrically opposite each other.

9. The clutch plate of claim 1, wherein the windows for the elements of said other set are disposed substantially diametrically opposite each other.

10. The clutch plate of claim 1, wherein the windows of said other member for the elements of said one set are larger than the windows of said other member for the elements of said other set.

11. The clutch plate of claim 1, wherein each of said sets comprises two elements and the elements of said one set alternate with the elements of said other set in the circumferential direction of said members, each of said elements comprising at least one coil spring.

12. The clutch plate of claim 1, wherein said other member is said output member and said one member includes two discs, said projections including distancing elements disposed between and connecting said discs to each other.

* * * * *